United States Patent [19]
Howell et al.

[11] Patent Number: 4,639,933
[45] Date of Patent: Jan. 27, 1987

[54] STEERING LOGIC CIRCUIT FOR A DIGITAL DATA TRANSCEIVER

[75] Inventors: Edward K. Howell, Simsbury; Thomas E. Anderson, Avon, both of Conn.

[73] Assignee: General Electric Company, Portsmouth, Va.

[21] Appl. No.: 792,239

[22] Filed: Oct. 29, 1985

Related U.S. Application Data

[63] Continuation of Ser. No. 561,483, Dec. 14, 1983, abandoned.

[51] Int. Cl.⁴ .............................................. H04L 5/16
[52] U.S. Cl. ................................... 375/8; 375/36
[58] Field of Search ........................... 375/36, 7–9; 370/32; 340/825.5, 310 R; 179/2 DP

[56] References Cited
U.S. PATENT DOCUMENTS

| | | | |
|---|---|---|---|
| 3,614,318 | 10/1971 | Klose et al. | 375/7 |
| 3,798,598 | 3/1974 | Tambert et al. | |
| 3,919,461 | 11/1975 | Hunting et al. | 178/2 |
| 4,063,220 | 12/1977 | Metcalfe et al. | |
| 4,103,105 | 7/1978 | Akiyama et al. | 455/79 |
| 4,171,467 | 10/1979 | Evenchik | 179/2 DP |
| 4,234,952 | 11/1980 | Gable et al. | 340/825.5 |
| 4,259,663 | 3/1981 | Gable | |
| 4,271,523 | 6/1981 | Gable | 371/57 |
| 4,282,512 | 8/1981 | Boggs et al. | 340/825.5 |
| 4,337,465 | 6/1982 | Spracklen et al. | 375/36 |
| 4,425,665 | 1/1984 | Stauffer | 375/9 |

Primary Examiner—Robert L. Griffin
Assistant Examiner—Curtis Kuntz

[57] ABSTRACT

Steering logic (10) for interconnecting a transceiver (11) with a baseband bus is disclosed. The transceiver is connected to a broadband bus and transmits or receives modulated carrier wave signals. The transceiver has a data in terminal (16 or 19) and a data out terminal (18 or 35) for inputting or outputting digital signals at baseband. The transceiver also has at least one control terminal (20 or 32 and 38) and is responsive to a control signal or signals for enabling or disabling the transmitting and receiving functions of the transceiver. The steering logic (10) includes a baseband bus terminal (A) to which may be applied baseband digital transmit signals and to which the steering logic may apply digital receive signals. The logic circuitry is responsive to baseband digital transmit signals applied to the baseband bus terminal (A) for generating a control signal or signals to enable the transmitting function and disable the receiving function of the transceiver.

6 Claims, 6 Drawing Figures

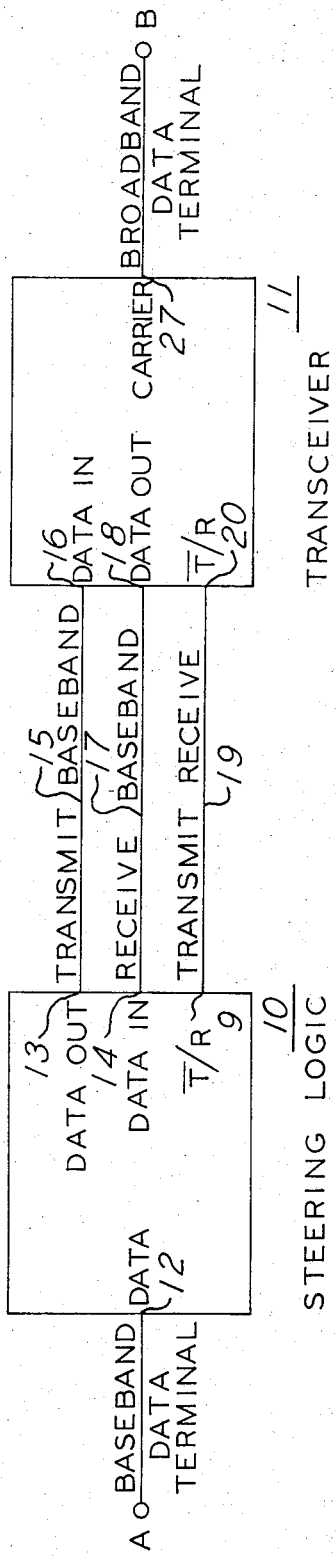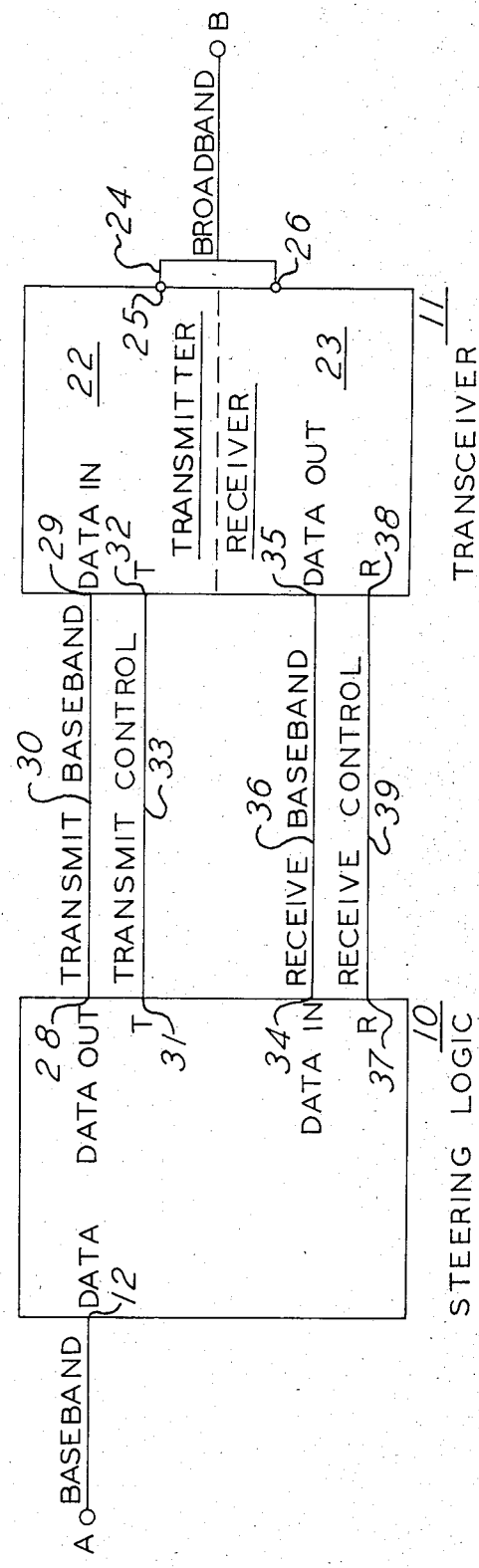

STEERING LOGIC CIRCUIT FOR A DIGITAL DATA TRANSCEIVER

This is a continuation of application Ser. No. 06/561,483 filed Dec. 14, 1983, now abandoned on Jan. 8, 1986.

BACKGROUND OF THE INVENTION

U.S. patent application Ser. No. 231,631 and U.S. Pat. No. 4,408,186 disclose means for providing power line communication over ground and neutral conductors of plural power line branch circuits. This application and patent are incorporated herein for purposes of reference.

In distributed control systems, such as used for energy management and load shedding functions, communication between various elements of the system is usually required. Digital control devices, such as microprocessors, typically communicate by a serial data stream over a pair of conductors where the bit symbols are defined by high or low voltage states on this pair of conductors. This is known as "baseband" communication of the digital data. Baseband communication requires a dedicated pair of conductors, known as a "baseband bus", connected between the various digital elements of a control system for this communication. It has been often found desirable to use the baseband data signals to modulate higher frequency carrier signals for communication, known as "broadband" communication. The carrier signals may be impressed upon the conductors of the power system for distribution within the desired control area. This technique is commonly known as "power line carrier" communication. Other broadband communication carrier frequencies may be used with direct radiation as in radio communication or in infrared or optical communication, and lower frequencies may be used in acoustic or ultrasonic communication. The device which converts baseband data signals to broadband (modulated carrier) data signals, and for conversion from broadband to baseband data signals, is known as a "transceiver". In a typical distributed digital control system, the individual digital control elements, such as microprocessors, exchange baseband data signals with individual transceivers which transfer the baseband data via broadband on a commonly connected single broadband data bus. Thus there are a plurality of baseband buses interconnected by a broadband bus.

In a distributed control system, it is sometimes desirable to interconnect several microprocessors on a single baseband bus and couple that baseband bus through a transceiver to the broadband bus. This reduces the number of transceivers required in a system, hence reducing system cost, but further requires that the transceiver have a novel automatic transmit/receive function.

In such a system, it has been found highly desirable that the various baseband buses appear to be directly interconnected in terms of their exchange of baseband signals, preserving the supreme and inferior characteristics of the two states of the baseband. A transceiver which will provide this apparent interconnection of the baseband buses is known as a "transparent" transceiver because: (1) a supreme state signal impressed upon the baseband input to one transceiver will create a like signal in the baseband output of all other transceivers commonly interconnected on the broadband bus, and (2) an attempt to impress an inferior state signal upon the baseband input to one transceiver will only create that inferior state signal in the baseband of all other transceivers commonly interconnected on the broadband bus if no other baseband is in the supreme state.

In order to provide orderly communication, as between the various devices interconnected on a common baseband bus, various techniques or protocols have been developed. In the "polling" protocol, a single master device sends messages to selected individual distributed devices which enables the selected individual device to respond on the bus. In "token passing" systems, a transmission-enabling message is sent from one device to another in an orderly sequence thereby enabling each device to transmit on the bus in turn. In the "multiple access" systems, each device is permitted spontaneous transmission provided that a "listen-before-talk" procedure is followed to prevent transmission when the bus is active with a transmission from another device. Multiple access is preferred in a distributed control system because it offers a faster system response and does not require a master system controller. However, even though each device follows the "listen-before-talk" protocol, it is possible that two devices may start message transmission simultaneously. This condition is known as "contention" for use of the bus. Contention usually results in the destruction of data in the contending messages, known as "collision". It is, therefore, highly desirable in a multiple access system that contention be resolved, eliminating all transmitters but one, prior to collision, in order to avoid the destruction of the data. Contention resolution with collision avoidance results in faster system response and greater system reliability.

In broadband communication, the carrier signal may be modulated by the data signal in amplitude, frequency or phase. These modulation techniques are respectively known as amplitude shift keying (ASK) (also called on-off-keying when the amplitude modulation is 100%), frequency shift keying (FSK), and phase shift keying (PSK). Many different transceiver concepts for the various modulation techniques are currently available, however none show the characteristics of transparency as described above.

The purpose of this invention is to provide a transceiver which provides automatic transmit/receive control and a transceiver which provides the transparent exchange of digital data between a baseband data bus and a broadband data bus, thereby permitting contention resolution with collision avoidance.

SUMMARY OF THE INVENTION

The invention comprises a transceiver circuit which provides a transparent interface between a baseband data bus and a broadband modulated carrier data bus. In addition to transmitter-receiver components, the circuit also includes steering logic interconnected between the transmitter-receiver and the baseband bus for providing transparency, thereby permitting contention resolution and collision avoidance. The transceiver is interconnected with the broadband data bus by a first pair of conductors and with the baseband data bus by a second pair of conductors.

BRIEF DESCRIPTION OF THE DRAWINGS

FIG. 1 is a diagrammatic representation of the circuit blocks employed with one embodiment of the transceiver according to the invention;

FIG. 2 is a diagrammatic representation of the circuit blocks employed with another embodiment of the transceiver or with a separate transmitter and receiver according to the invention;

DESCRIPTION OF THE PREFERRED EMBODIMENT

Figure 3:
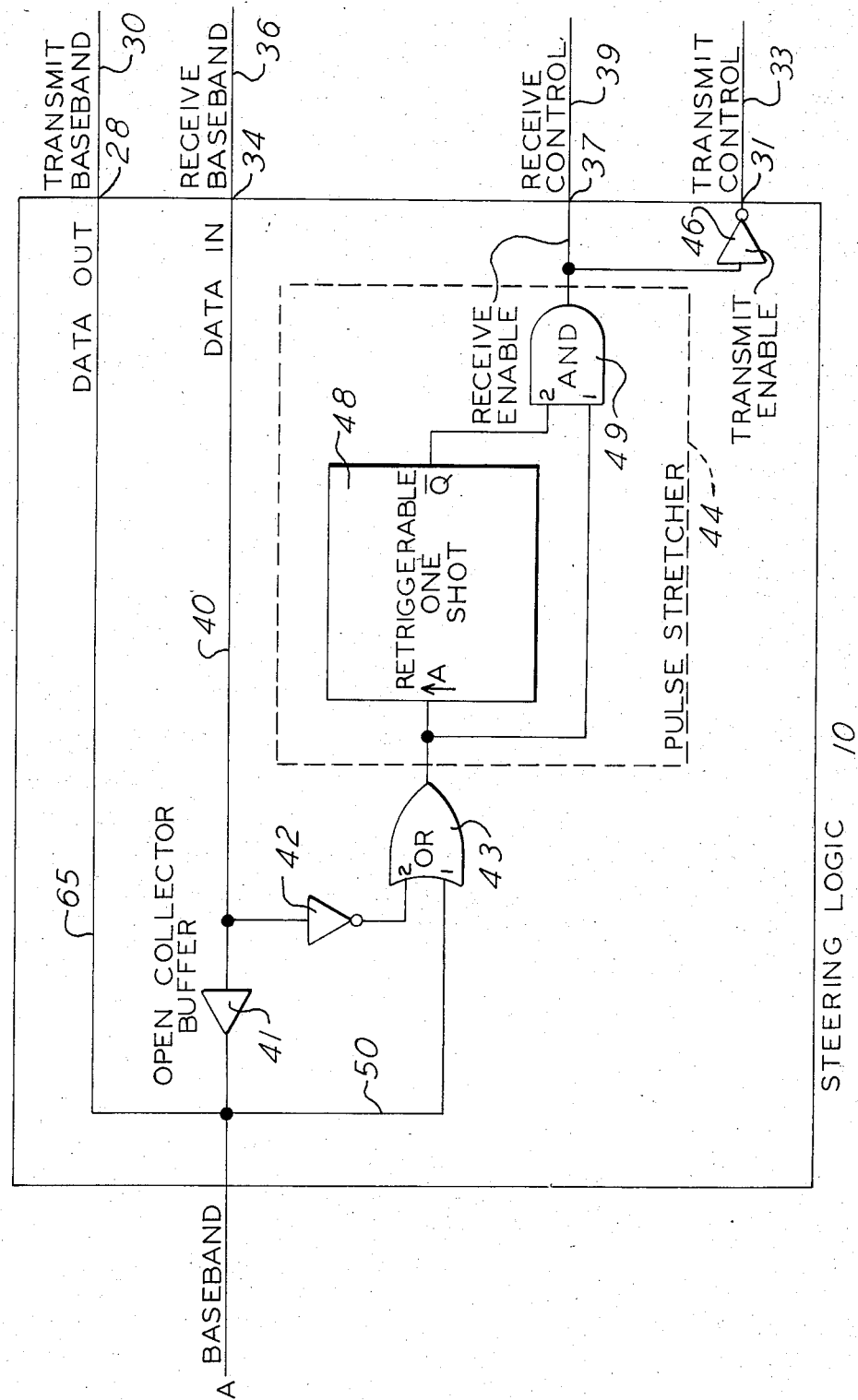
FIG. 3 is a circuit diagram for the steering logic employed within the embodiments depicted in FIGS. 1 and 2.

FIG. 1 depicts a baseband terminal A for connecting with a baseband data bus system and a terminal B for connection with a broadband data bus. Terminals A and B each comprise a pair of conductors, although only one is shown. Steering logic 10 is connected with the baseband terminal by means of data terminal 12 and with a transceiver 11 for providing the requisite transparency functions to the transceiver. Transceiver 11, which can be AM, FM or Phase Modulation, is connected to the broadband terminal by means of CARRIER terminal 27. The transceiver is connected to the steering logic by means of the DATA IN terminal 16 on the transceiver with the DATA OUT terminal 13 on the steering logic over transmit baseband line 15 and with the DATA OUT terminal 18 on the transceiver connected with the DATA IN terminal 14 on the steering logic over receive baseband line 17. The transmit/-receive control (T̄/R) terminals 20, 9 of the transceiver 11 and steering logic 10 are interconnected by trans mit/receive line 19. For purposes of this disclosure, T̄/R signifies that when line 19 is high, the transceiver functions as a receiver of carrier signals and when line 19 is low, the transceiver functions as a transmitter of carrier signals. Baseband signals appearing at terminal A result in modulated carrier signals at broadband terminal B and modulated carrier signals appearing at the broadband terminal produce baseband signals at terminal A. The operation of the steering logic for the various types of modulation will be discussed in detail below.

FIG. 2 contains a transceiver 11 wherein the transmitter 22 and receiver 23 can be separately connected with the steering logic by means of a transmit baseband line 30 which connects the DATA IN terminal 29 on the transmitter with the DATA OUT terminal 28 on the steering logic and with a transmit-control line 33 which connects the transmit-control terminals 32, 31 on the transceiver and steering logic. A receive baseband line 36 interconnects the DATA OUT terminal 35 on the receiver with the DATA IN terminal 34 on the steering logic and a receive-control line 39 interconnects the receive-control terminal 38 on the receiver with the receive-control terminal 37 on the steering logic. The transmitter terminal 25 and the receiver terminal 26 interconnect with each other and with the broadband by means of a line 24. In the manner described earlier, baseband signals appearing at the baseband terminal produce modulated carrier signals at the broadband terminal and vice versa.

The components within the steering logic 10 of FIGS. 1 and 2 for FSK, PSK or ASK modulation are shown in FIG. 3 with the outputs of the steering logic arranged for connection with the separate receiver-transmitter embodiment of FIG. 2, so that common reference numerals will be employed. The receive baseband line 36 is connected through terminal 34 with baseband terminal A through an open collector buffer 41, such as a Signetics Type 74LS07, over line 40 and through an inverter 42 with terminal 2 of an OR gate 43. A diode or a transistor can also be used as a buffer providing that the logic levels are suitable. Terminal 1 of OR gate 43 connects with the baseband terminal by means of line 50 and with the transmit baseband line 30 through line 65 and terminal 28. The output of OR gate 43 is connected through a pulse stretcher 44 and terminal 37 to the receive-control line 39 and through an inverter 46 and terminal 31 to the transmit-control line 33. When used with the embodiment depicted in FIG. 1, the T̄/R line 19 is connected with receive-control terminal 37, omitting inverter 46 and terminal 31. The pulse stretcher 44 comprises a retriggerable one-shot 48, such as a Motorola Type MC14528B monostable multivibrator, which is triggered on the rising edge of the output of the OR gate applied to terminal A of the one shot. The inverse output Q̄ is connected to terminal 2 of an AND gate 49 and terminal 1 of the AND gate is connected to the output of the OR gate.

For purposes of this disclosure, the following definitions will be used throughout in describing the operation of the steer-ing logic 10.

The digital signals reprsented by the two states appearing at the baseband, namely, the "supreme" state being a low voltage and impedance, will also be referred to as "low", and the "inferior" state being a high voltage and impedance, will also be referred to as "high". The inactive state of the baseband bus is also high and in the inactive state the transmitter must transmit no carrier. The inactive state of the broadband bus is the absence of carrier. However, for the aforementioned forms of modulation, the two states of the baseband bus must be translated to two states of carrier on the broadband bus, such as frequency 1, frequency 2 ($f_1$, $f_2$), or phase 1, phase 2 ($\phi_1$, $\phi_2$) or amplitude 1, amplitude 2 ($A_1$, $A_2$) where both $A_1$ and $A_2$ are greater than zero. Thus, the high state occurring within a message requires the transmission of carrier, but in the inactive state, must not result in carrier. If the baseband bus at terminal A is pulled low, the transmitter 22 is enabled and the receiver 23 is disabled. The purpose of the pulse stretcher 44 is to hold the transmitter 22 in the transmit mode for a duration longer than the maximum duration of any high state contained within a message in order to transmit the carrier state representative of the high state of the baseband bus. If the baseband is high longer than the time duration of the pulse stretcher, there is an inactive state and the transmitter 22 is disabled and the receiver 23 is enabled. When the receive baseband line 36 is pulled low by the presence of carrier having the proper state from another transceiver, the open collector buffer 41 pulls the baseband bus low and under this condition maintains the receiver 23 enabled and the transmitter 22 disabled. Since the baseband bus is maintained in the high state by means of a bias resistor (not shown), all devices connected to the baseband bus drive the bus to the low state through a similar open collector buffer.

Figure 4:
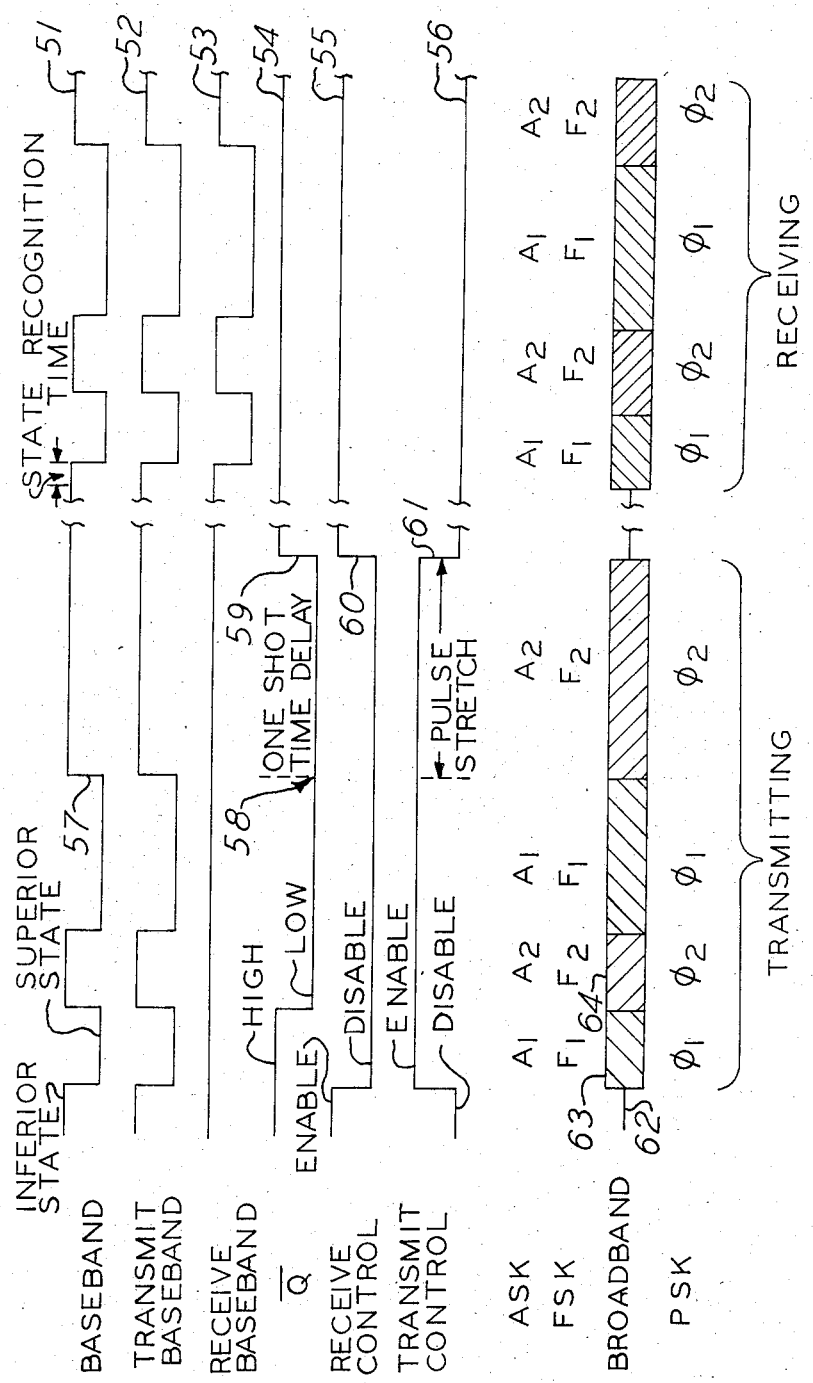
FIG. 4 is a graphic representation of the timing diagrams of the data and control signals for the embodiment depicted in FIG. 2 with the steering logic depicted in FIG. 3.

The operation of the steering logic depicted in FIG. 3 for ASK, FSK and PSK modulation can be seen by referring to the timing diagrams shown in FIG. 4 for both transmitting and receiving modes. The inferior state is depicted as the high voltage and the superior state is depicted as the low voltage condition on the baseband waveform 51, transmit baseband waveform 52 and receive baseband waveform 53. The enable and disable state of the receive-control waveform 55 and transmit-control waveform 56, as well as the high and low states of the $\overline{Q}$ waveform 54, are depicted as high and low voltage conditions, respectively.

When another digital control device transmits, this initiates broadband modulation states $A_1$, $F_1$ or $\emptyset_1$, which results in a superior state on the baseband of the receiving digital control device. However, in the receive mode, there is a short time delay known as "state recognition time" which is incorporated in the receiver to distinguish a true signal from noise. This state recognition time exists in transitions from inferior to superior states and from superior to inferior states throughout the message. This is indicated in FIG. 4 by the offset dashed line between the conditions of modulation on the broadband and the transitions on the baseband waveform 51. This state recognition time, incorporated in the receiver 23, is a common technique used in receivers and is sometimes referred to as "carrier sense time". In order to ensure that the receive-control waveform 55 remains in the enable state during the receiving of a message, even though the baseband waveform 51 goes to the superior state, one input of the OR gate must remain high. Since both inputs 1, 2 to AND gate 49 are high in the receiving mode, the output is high and the receive-control line 39 is high (enabled) by direct connection with the AND gate output while the transmit-control line 33 is low (disabled) through connection with the AND gate output through inverter 46. The baseband bus, by connection with the transmit baseband line 30 over line 65, directly controls the state of the transmit baseband line. Prior to transmitting, the digital control device must ensure that the baseband has been in the inferior state for a specified time greater than the maximum duration of any inferior state contained within a message. Once it has been determined that there is no other message on the bus, the digital control device can then pull the baseband to the superior state.

In the timing diagrams of FIG. 4, the baseband state controls the condition of the broadband in the transmitting mode and the broadband condition controls the state of the baseband in the receiving mode. Since the baseband terminal A and the transmit baseband line 30 are connected together by line 65, their waveforms 51, 52 are identical for both the transmit and receive modes. For purposes of this discussion, only the baseband waveform 51 will be referred to. When the digital control device starts the transmitting mode, the baseband waveform 51 is in the superior state (low), transmit baseband line 30 is low and receive baseband line 36 is high. Both inputs 1, 2 to the OR gate 43 in FIG. 3 are low resulting in a low state out of the OR gate which is applied to the one-shot 48 and to input 1 of the AND gate 49. When either of the AND gate inputs 1, 2 is low, the output to receive-control line 39 is low resulting in the disable state of the receive-control waveform 55. The AND gate output is inverted through inverter 46 to a high on transmit-control line 33 resulting in the enable state of the transmit-control waveform 56 as indicated. Once the receive control line 39 is disabled, the receive baseband waveform 53 remains high throughout the entire message. When the baseband waveform 51 is in the superior state and the transmit-control waveform 56 is in the enable state, amplitude $A_1$, frequency $F_1$, or phase $\emptyset_1$ will appear on the broadband as indicated at 63 in FIG. 4. When the baseband waveform 51 is in the inferior state and the transmit-control waveform 56 is in the enable state, then amplitude $A_2$, frequency $F_2$ or phase $\emptyset_2$ appear on the broadband as indicated at 64. The inactive state of the broadband comprises the absence of signal which is indicated at 62. These conditions of modulation wherein the states of the baseband alternate between inferior and superior states continue throughout the duration of the message.

In order to maintain the broadband signal in the second condition, $A_2$, $F_2$ or $\emptyset_2$ during the time when the baseband is in the inferior state, the transmit-control waveform 56 must remain in the enable state. This is accomplished by triggering the pulse stretcher 44. Since input 2 to the OR gate 43 is always low when the receive baseband line 36 is high, the output of the OR gate will track the baseband. When the baseband goes to the inferior state, the OR gate output to the retriggerable one-shot input terminal A causes the one-shot output $\overline{Q}$ to remain low for a pre-determined time period greater than the longest anticipated inferior state in the message. This low state at the $\overline{Q}$ terminal, as indicated on the $\overline{Q}$ waveform 54, is applied to terminal 2 of the AND gate 49 to maintain the receive-control line 39 and waveform 55 in the disable state and the transmit-control line 33 and waveform 56 in the enable state during the inferior state of the baseband. When the baseband changes from the superior to the inferior state, the retriggerable one-shot 48 is reset and starts retiming. The last transition in the message, as indicated at 57 on the baseband waveform 51, results in the start of time-out of the pulse stretcher as indicated at 58 on the $\overline{Q}$ waveform 54. At the end of the time delay period of the retriggerable one-shot, indicated at 59, the $\overline{Q}$ waveform 54 returns to the high state enabling the receiver, as indicated at 60 on the receive-control waveform 55 and disabling the transmitter as indicated at 61 on the transmit enable waveform 56 to complete the message. Hence, all other digital control devices connected to the broadband or baseband buses can now initiate a transmission according to a predefined bus access protocol.

It is to be noted from the previous discussion relative to the steering logic 10 of FIG. 3 that automatic transmit-control and receive-control are provided for ASK, FSK and PSK modulation, but that the associated transceiver is not considered to be fully transparent within the aforementioned definition of "transparency".

Figure 5:
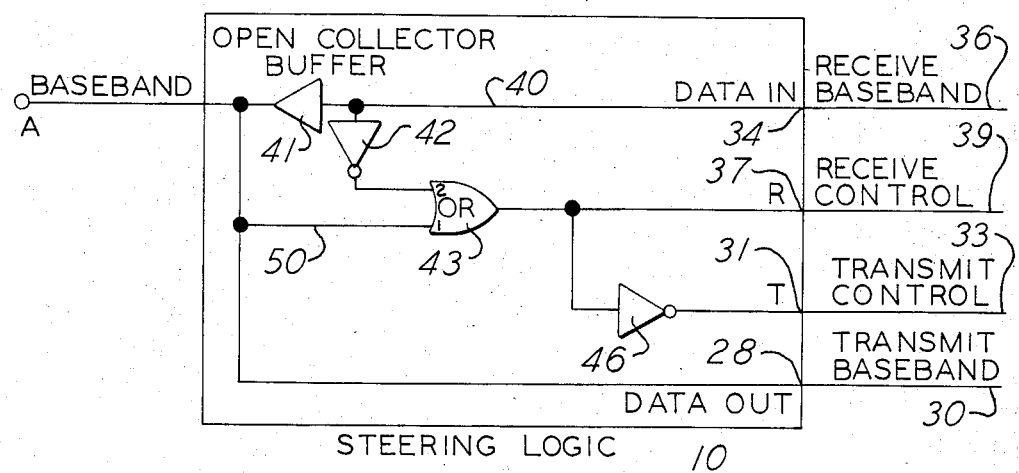
FIG. 5 is a block diagram representation of the steering logic employed which provides transparency when employed with ASK 100% modulation.
Figure 6:
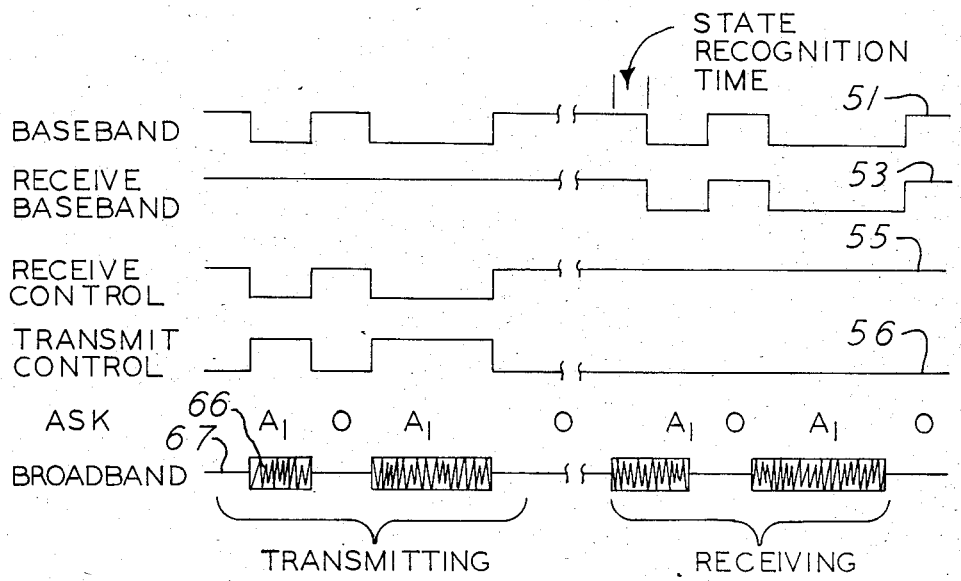
FIG. 6 is a graphic representation of the data and control signals for the embodiments depicted in FIGS. 1 or 2 using the steering logic of FIG. 5 with ASK 100% modulation.

With ASK 100% modulation, the carrier is either present or absent such that the supreme state corresponds to the presence of carrier as indicated at 66 in FIG. 6 and the inferior state corresponds to the absence of carrier as indicated at 67. When this modulation is used, the simplified steering logic 10 of FIG. 5 is employed. The pulse stretcher is not required since the broadband inferior state corresponding to the baseband inferior state is the absence of carrier which is the same as with the transmitter disabled. The receive baseband line 36 in FIG. 5 connects through terminal 34, line 40 and inverter 42 with input 2 of the OR gate 43 and with the baseband terminal A through the open collector buffer 41. The baseband terminal A directly connects with the output side of the open collector buffer 41, input 1 of the OR gate over line 50 and with transmit baseband line 30 through terminal 28. The output of the OR gate connects with the receive-control line 39 through terminal 37 and with the transmit-control 33 through inverter 46 and terminal 31. When used with the embodiment depicted in FIG. 1, the $\overline{T/R}$ line 19 is connected with receive control terminal 37, omitting inverter 46 and terminal 31. Transmit baseband line 30 is generally omitted with ASK 100% modulation since on-off keying does not usually require modulation input to the transmitter. If the baseband bus is pulled low by a digital control device, the transmitter is enabled and the receiver is disabled directly. When carrier is received on the broadband, the receive baseband line 36 pulls the baseband low, the receiver remains enabled and the transmitter remains disabled. Thus, the direct data exchange between broadband and baseband buses provides full transparency.

The timing diagrams depicted in FIG. 6 illustrate the conditions occurring at the baseband terminal A, the transmit baseband line 30, the receive baseband line 36, the receive-control line 39 and the transmit-control line 33 for the ASK 100% modulation employed with the steering logic 10 of FIG. 5. The transmit-control and transmit baseband waveforms are identical so that only the transmit-control waveform 56 is depicted in FIG. 6. Since the presence of carrier on the broadband corresponds to the superior state of the baseband and the absence of carrier corresponds to the inferior state of the baseband, the ASK modulation is depicted as $A_1$ and 0 (zero), respectively. The state recognition time is required in the receive mode to distinguish a true signal from noise, as described earlier. When the digital control device pulls the baseband bus low, the transmit baseband line 30 in FIG. 5 is pulled low and the receive baseband line 36 is high for the following reasons. Input 1 to OR gate 43 is low by direct connection with the baseband terminal over line 50 and input 2 is low by connection through inverter 42 with the high receiver baseband line 36 over line 40 resulting in a low at the OR gate output. The receive control line 39 is low by direct connection with the OR gate output and both the transmit control line 33 and transmit baseband line 30 are high by connection to the OR gate output through inverter 46. The baseband waveform 51 is in the superior state and the receive baseband waveform 53 is in the inferior state as shown in FIG. 6. The receive-control waveform 55 is in the disabled state while the transmit-control waveform 56 is in the enabled state. When the digital control device allows the baseband bus to go high (inferior state) in the transmitting mode or in the inactive state, the receiving mode is invoked since the inferior state on the broadband bus is the absence of carrier. When a carrier does appear on the broadband bus in the receiving mode, the receive baseband line 36 is low, which pulls the baseband bus low. Input 2 to OR gate 43 is high by connection with line 36 by means of terminal 24, line 40 and inverter 42. This is reflected in the superior state of the baseband waveform 51 and the low state of the receive baseband waveform 53 in FIG. 6. The output of the OR gate is high which impresses a high on receive-control line 39 by connection through terminal 37. The transmit-control line 33 and transmit baseband line 30 are both low by connection with the OR gate output through inverter 46. The receive-control waveform 55 is in the enabled state and the transmit-control waveform 56 is in the disabled state as shown in FIG. 6. It is seen, therefore, that ASK 100% modulation allows for the completely transparent exchange of data between the baseband bus and the broadband bus without the appearance of conflict. It will be readily appreciated by those skilled in the art that utilizing the steering logic concept teachings of the invention with suitable modifications will allow the use of a transceiver for other purposes and that the steering logic function can be achieved by other logic devices and circuits.

Although the inventions have been described with reference to a specific embodiment thereof, numerous modifications thereof are possible without departing from the inventions and it is desirable to cover all modifications falling within the spirit and scope of these inventions.

We claim:

1. Steering logic for interconnecting a transceiver with a baseband bus, said transceiver being connected to a broadband bus for transmitting or receiving modulated carrier wave signals on said broadband bus, said transceiver having data in and data out terminals for inputting or outputting digital signals at baseband and at least one control terminal for receiving a control signal, said transceiver being responsive to said control signal for enabling or disabling transmitting or receiving functions of said transceiver, said steering logic comprising:
 a baseband bus terminal to which baseband digital transmit signals may be applied and to which baseband digital receive signals from said transceiver are applied;
 a buffer connected between the data out terminal of said transceiver and said baseband bus terminal; and
 logic means having inputs connected to said baseband bus terminal and the data out terminal of said transceiver and an output connected to said at least one control terminal, said logic means being responsive to baseband digital transmit signals applied to said baseband bus terminal for generating said control signal to enable the transmitting function and to disable the receiving function of said transceiver.

2. The steering logic for interconnecting a transceiver with a baseband bus as recited in claim 1 wherein said buffer is an open collector buffer and further comprising a direct connection between the data in terminal of said transceiver and said baseband bus terminal.

3. The steering logic for interconnecting a transceiver with a baseband bus as recited in claim 1 wherein said logic means comprises:
 an OR gate having one input connected to said baseband terminal; and
 an inverter connected between said data out terminal and a second input of said OR gate.

4. Steering logic for interconnecting a transceiver with a baseband bus as recited in claim 3 wherein said transceiver has first and second control terminals to which a receive control signal and a transmit control signal, respectively, may be applied, the output of said logic means being directly connected to said first control terminal, said steering logic further comprising a second inverter connected between the output of said logic means and said second control terminal.

5. Steering logic for interconnecting a transceiver with a baseband bus as recited in claim 3 wherein said logic means further comprises pulse stretching means connected between an output of said OR gate and the output of said logic means for maintaining a control signal output for a predetermined time period after the termination of the application of baseband digital transmit signals to said baseband bus terminal.

6. Steering logic for interconnecting a transceiver with a baseband bus as recited in claim 5 wherein said pulse stretching means comprises:

a retriggerable one shot connected to the output of said OR gate; and an AND gate having a first input connected to the output of said OR gate and a second input connected to an inverted output of said retriggerable one shot.

* * * * *